US012745053B2

(12) United States Patent
Schmidt et al.

(10) Patent No.: US 12,745,053 B2
(45) **Date of Patent: *Sep. 22, 2026**

(54) EFFICIENT RENDERING OF VIRTUAL SOUNDFIELDS

(71) Applicant: Magic Leap, Inc., Plantation, FL (US)

(72) Inventors: Brian Lloyd Schmidt, Bellevue, WA (US); Samuel Charles Dicker, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/811,563

(22) Filed: Aug. 21, 2024

(65) Prior Publication Data

US 2024/0414493 A1 Dec. 12, 2024

Related U.S. Application Data

(63) Continuation of application No. 18/486,938, filed on Oct. 13, 2023, now Pat. No. 12,120,499, which is a (Continued)

(51) Int. Cl.

| | |
|---|---|
| ***H04S 7/00*** | (2006.01) |
| ***G10L 19/008*** | (2013.01) |

(Continued)

(52) U.S. Cl.

CPC ............ *H04S 7/303* (2013.01); *G10L 19/008* (2013.01); *G10L 25/21* (2013.01); *H04S 3/008* (2013.01);

(Continued)

(58) Field of Classification Search

CPC ...... H04S 3/008; H04S 7/303; H04S 2420/01; H04S 2400/01; H04S 2400/11; G10L 19/008; G10L 25/21

See application file for complete search history.

(56) References Cited

U.S. PATENT DOCUMENTS

| | | | |
|---|---|---|---|
| 4,852,988 | A | 8/1989 | Velez |
| 6,433,760 | B1 | 8/2002 | Vaissie |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

Bosun Xie, Jens Blauert. (Jul. 1, 2013). "Section 6.5 Simplification of Signal Processing for Binaural Virtual Source Synthesis," Head-Related Transfer Function and Virtual Auditory Display, Jul. 1, 2013, pp. 215-221, Retrieved from the Internet: URL:ebookcentral.proquest.com/lib/epo-ebooks/detail.action?docID=3319556 [retrieved on Jun. 16, 2021].

(Continued)

*Primary Examiner* — Kile O Blair

(74) *Attorney, Agent, or Firm* — Tobias Intellectual Property Law, PLLC

(57) ABSTRACT

An audio system and method of spatially rendering audio signals that uses modified virtual speaker panning is disclosed. The audio system may include a fixed number F of virtual speakers, and the modified virtual speaker panning may dynamically select and use a subset P of the fixed virtual speakers. The subset P of virtual speakers may be selected using a low energy speaker detection and culling method, a source geometry-based culling method, or both. One or more processing blocks in the decoder/virtualizer may be bypassed based on the energy level of the associated audio signal or the location of the sound source relative to the user/listener, respectively. In some embodiments, a virtual speaker that is designated as an active virtual speaker at a first time, may also be designated as an active virtual speaker at a second time to ensure the processing completes.

20 Claims, 15 Drawing Sheets

Related U.S. Application Data continuation of application No. 18/053,717, filed on Nov. 8, 2022, now Pat. No. 11,843,931, which is a continuation of application No. 17/412,084, filed on Aug. 25, 2021, now Pat. No. 11,546,714, which is a continuation of application No. 16/861,111, filed on Apr. 28, 2020, now Pat. No. 11,134,357, which is a continuation of application No. 16/438,358, filed on Jun. 11, 2019, now Pat. No. 10,667,072.

(60) Provisional application No. 62/684,093, filed on Jun. 12, 2018.

(51) Int. Cl.
*G10L 25/21* (2013.01)
*H04S 3/00* (2006.01)

(52) U.S. Cl.
CPC ....... *H04S 2400/01* (2013.01); *H04S 2420/01* (2013.01)

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,667,072 | B2 | 5/2020 | Schmidt |
| 11,134,357 | B2 | 9/2021 | Schmidt et al. |
| 11,546,714 | B2 | 1/2023 | Schmidt et al. |
| 11,843,931 | B2 | 12/2023 | Schmidt et al. |
| 12,120,499 | B2 | 10/2024 | Schmidt et al. |
| 2003/0007648 | A1 | 1/2003 | Currell |
| 2003/0026441 | A1 | 2/2003 | Faller |
| 2003/0030597 | A1 | 2/2003 | Geist |
| 2006/0023158 | A1 | 2/2006 | Howell et al. |
| 2009/0046864 | A1 | 2/2009 | Mahabub et al. |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0207310 | A1 | 8/2012 | Kirkeby et al. |
| 2013/0077147 | A1 | 3/2013 | Efimov |
| 2014/0195918 | A1 | 7/2014 | Friedlander |
| 2015/0131824 | A1 | 5/2015 | Nguyen |
| 2015/0168731 | A1 | 6/2015 | Robbins |
| 2017/0245089 | A1 | 8/2017 | Freimann et al. |
| 2018/0014140 | A1 | 1/2018 | Milevski et al. |
| 2018/0206038 | A1 | 7/2018 | Tengelsen et al. |
| 2019/0139554 | A1 | 5/2019 | Sun |

FOREIGN PATENT DOCUMENTS

| | | | |
|---|---|---|---|
| CA | 2388766 | A1 | 12/2003 |
| JP | 2010520671 | A | 6/2010 |
| JP | 2017055149 | A | 3/2017 |
| WO | 2009001277 | A1 | 12/2008 |
| WO | 2017142759 | A1 | 8/2017 |
| WO | 2018053047 | A1 | 3/2018 |

OTHER PUBLICATIONS

Chinese Office Action dated May 18, 2024, for CN Application No. 201980048983.7, with English translation, 14 pages.

European Office Action dated Jun. 30, 2023, for EP Application No. 19818616.5, six pages.

European Search Report dated Jun. 25, 2021, for EP Application No. 19818616.5, eleven pages.

Final Office Action mailed Dec. 30, 2020, for U.S. Appl. No. 16/861,111, filed Apr. 28, 2020, ten pages.

International Preliminary Report on Patentability and Written Opinion mailed Dec. 15, 2020, for PCT Application No. PCT/US2019/36710, filed Jun. 12, 2019, five pages.

International Search Report mailed Sep. 10, 2019, for PCT Application No. PCT/US19/36710, filed Jun. 12, 2019, three pages.

Jacob, R. "Eye Tracking in Advanced Interface Design", Virtual Environments and Advanced Interface Design, Oxford University Press, Inc. (Jun. 1995).

Japanese Final Office Action mailed Sep. 12, 2024, for JP Application No. 2023-150990, with English translation, 5 pages.

Japanese Notice of Allowance mailed Nov. 16, 2023, for JP Application No. 2020568524, with English translation, 6 pages.

Japanese Office Action mailed Jun. 16, 2023, for JP Application No. 2020-568524, with English translation, 5 pages.

Jean-Marc Jot. (Dec. 3, 2012). "Interactive 3D Audio Rendering in Flexible Playback Configurations," Signal&Information Processing Association Annual Summit and Conference (APSIPA ASC), 2012 Asia-Pacific, IEEE, pp. 1-9, *the whole document*.

Non-Final Office Action mailed Jun. 25, 2020, for U.S. Appl. No. 16/861,111, filed Apr. 28, 2020, ten pages.

Notice of Allowance mailed Jan. 21, 2020, for U.S. Appl. No. 16/438,358, filed Jun. 11, 2019, eight pages.

Notice of Allowance mailed Jul. 25, 2024, for U.S. Appl. No. 18/486,938, filed Oct. 13, 2023, seven pages.

Notice of Allowance mailed May 26, 2021, for U.S. Appl. No. 16/861,111, filed Apr. 28, 2020, seven pages.

Notice of Allowance mailed Sep. 15, 2023, for U.S. Appl. No. 18/053,717, filed Nov. 8, 2022, five pages.

Notice of Allowance mailed Sep. 23, 2022, for U.S. Appl. No. 17/412,084, filed Aug. 25, 2021, five pages.

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Chinese Notice of Allowance dated Apr. 18, 2025, for CN Application No. 201980048983.7, with English translation, 4 pages.

European Office Action dated Mar. 21, 2025, for EP Application No. 19818616.5, seven pages.

Japanese Notice of Allowance mailed May 20, 2025, for JP Application No. 2023-150990, with English translation, 4 pages.

Chinese Office Action dated Nov. 25, 2024, for CN Application No. 201980048983.7, with English translation, 7 pages.

Japanese Office Action mailed Jan. 10, 2025, for JP Application No. 2023-150990, with English translation, 10 pages.

EFFICIENT RENDERING OF VIRTUAL SOUNDFIELDS

REFERENCE TO RELATED APPLICATIONS

This application is a continuation of U.S. patent application Ser. No. 18/486,938, filed Oct. 13, 2023, which is a continuation of U.S. patent application Ser. No. 18/053,717, filed Nov. 8, 2022, now U.S. Pat. No. 11,843,931, issued Dec. 12, 2023, which is a continuation of U.S. patent application Ser. No. 17/412,084, filed Aug. 25, 2021, now U.S. Pat. No. 11,546,714, issued Jan. 3, 2023, which is a continuation of U.S. patent application Ser. No. 16/861,111, filed Apr. 28, 2020, now U.S. Pat. No. 11,134,357, issued Sep. 28, 2021, which is a continuation of U.S. patent application Ser. No. 16/438,358, filed on Jun. 11, 2019, now U.S. Pat. No. 10,667,072, issued May 26, 2020, which claims benefit of U.S. Provisional Patent Application No. 62/684,093, filed on Jun. 12, 2018, which are hereby incorporated by reference in their entirety.

FIELD

This disclosure relates in general to spatial audio rendering and associated systems. More specification, this disclosure relates to systems and methods for increasing the efficiency of virtual speaker-based spatial audio systems.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring-naturally, and consistently with the user's expectations of the sound—in the user's real environment. Generally speaking, users expect that virtual sounds will take on the acoustic properties of the real environment in which they are heard. For instance, a user of an XR system in a large concert hall will expect the virtual sounds of the XR system to have large, cavernous sonic qualities; conversely, a user in a small apartment will expect the sounds to be more dampened, close, and immediate. Additionally, users expect that virtual sounds will be presented without delays.

Ambisonics and non-ambisonics, among other techniques, may be used to generate spatial audio. For a large number of sound source objects, ambisonics or non-ambisonics may be an efficient way of rendering spatial audio because of its design and architecture. This may especially be the case when reflections are modelled. Ambisonics and non-ambisonics multi-channel based spatial audio systems may render the audio signals through several steps. Example steps can include a per-source encode step, a fixed overhead soundfield decode step, and/or a fixed speaker virtualization step. One or more hardware components may perform the steps.

In a first method for rendering the audio signals, each sound source can have its own pair of finite impulse response (FIR) filters. In such systems, a perceived position of a sound is changed by changing filter coefficients of FIR filters. In some embodiments, each sound may use a plurality (e.g., two pairs) of FIR filters. Each pair may use two filters (i.e., four FIR filters). As sounds move around the virtual environment, the FIR filters can be crossfaded. In some embodiments, four FIR filters may be used for each sound.

In a second method for rendering the audio signals, virtual speaker panning may be implemented using a fixed number of virtual speakers. Each sound source may be panned across the fixed virtual speakers. In some embodiments, a plurality (e.g., two) FIR filters may be used for each virtual speaker. The virtual speaker panning may be efficient for certain applications and may use a negligible amount of computation resources.

In some embodiments, a certain method may have increased efficiency compared to the other method depending on the number of sounds playing concurrently. For example, 30 sounds may be playing concurrently. If four FIR filters are used for each sound source, then 120 FIR filters (30 sound sources×4 FIR filters per sound source=120 FIR filters) may be required for the first method. If 2 FIR filters are used for each virtual speaker, then only 32 FIR filters may be required for the second method (16 virtual speakers×2 FIR filters per virtual speaker=32 FIR filters).

As another example, only one sound may be playing. The first method may require only four FIR filters (1 sound source×4 FIR filters per sound source=4 FIR filters), while the second method may require 32 FIR filters (16 virtual speakers×2 FIR filters per virtual speaker=32 FIR filters).

As illustrated through the above examples, the first method may be beneficial for a small number of sounds, and the second method may be beneficial for a large number of sounds. Accordingly, an audio system and method that increased the efficiency based on the number of sound sources at a given time may be desired.

BRIEF SUMMARY

An audio system and method of rendering audio signals that uses modified virtual speaker panning is disclosed. The audio system may include a fixed number F of virtual speakers, and the modified virtual speaker panning may dynamically select and use a subset P of the fixed virtual speakers. Each sound source may be panned across the subset P of virtual speakers. In some embodiments, a plurality (e.g., two) of FIR filters may be used for each virtual speaker of the subset P. The subset P of virtual speakers may be selected based one or more factors, such as proximity to a sound source. The subset P of virtual speakers may be referred to as active speakers.

The modified virtual speaker panning method can be compared to the above disclosed first and second methods by way of example. If three sounds are playing concurrently and the audio system has 16 fixed virtual speakers, the first method may require 12 FIR filters (3 sound sources×4 FIR filters per sound source=12 FIR filters), and the second method may require 32 FIR filters (16 virtual speakers×2 FIR filters per virtual speaker=32 FIR filters). The modified virtual speaker panning method, on the other hand, may dynamically select three virtual speakers to be active virtual speakers as part of the subset P. The modified virtual speaker panning method may require six FIR filters, two FIR filters for each active virtual speaker (3 virtual speakers×2 FIR filters=6 FIR filters).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
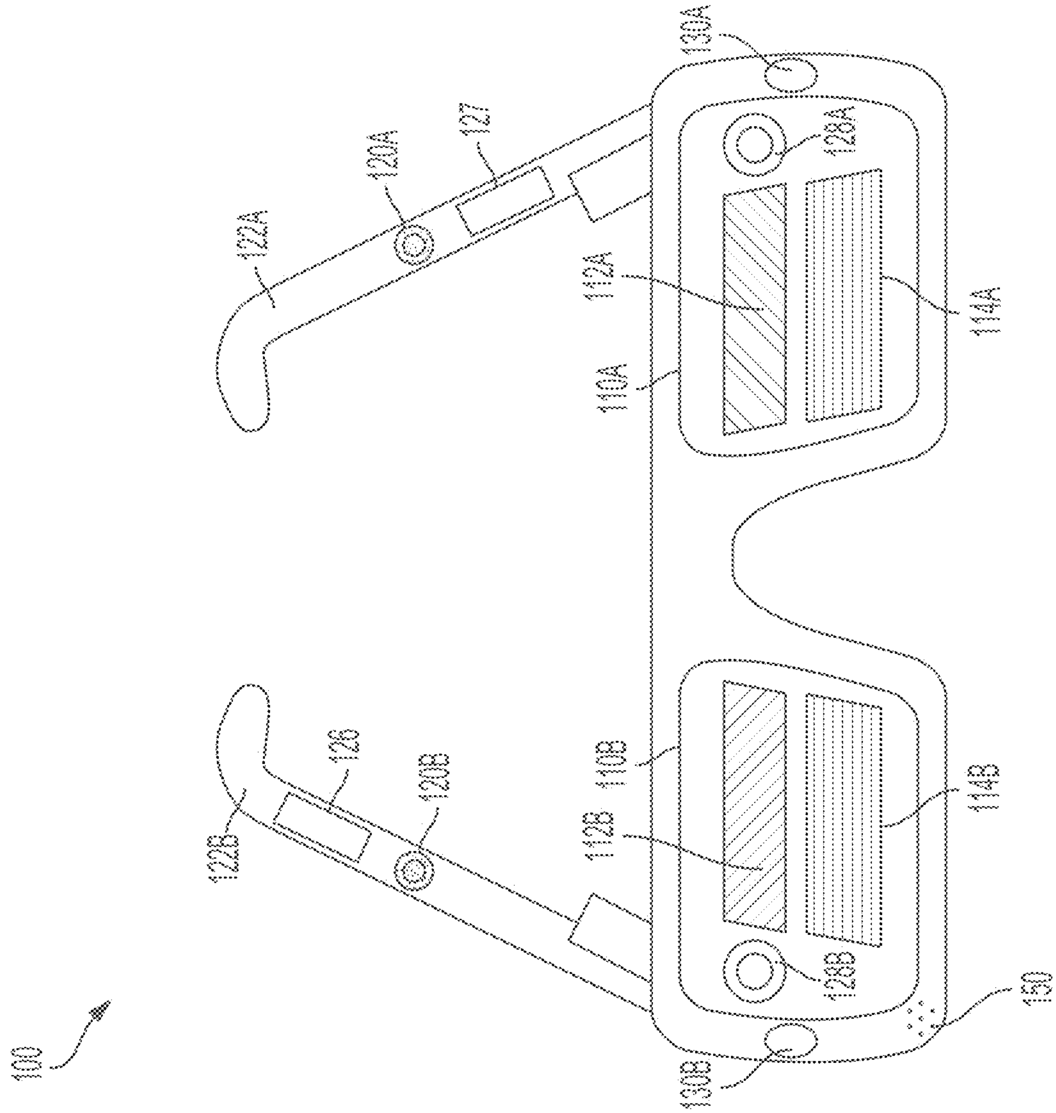
FIG. 1 illustrates an example wearable system, according to some embodiments.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMU) (e.g. IMU 126), acoustic sensors (e.g., microphone 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements) (e.g., eye cameras 128 and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned in a wearable head device adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
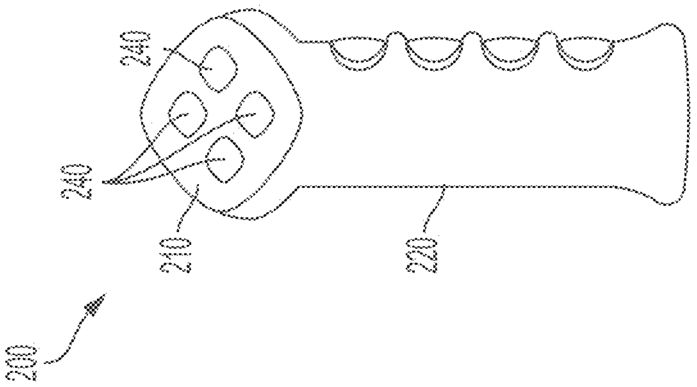
FIG. 2 illustrates an example handheld controller that can be used in conjunction with an example wearable system, according to some embodiments.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
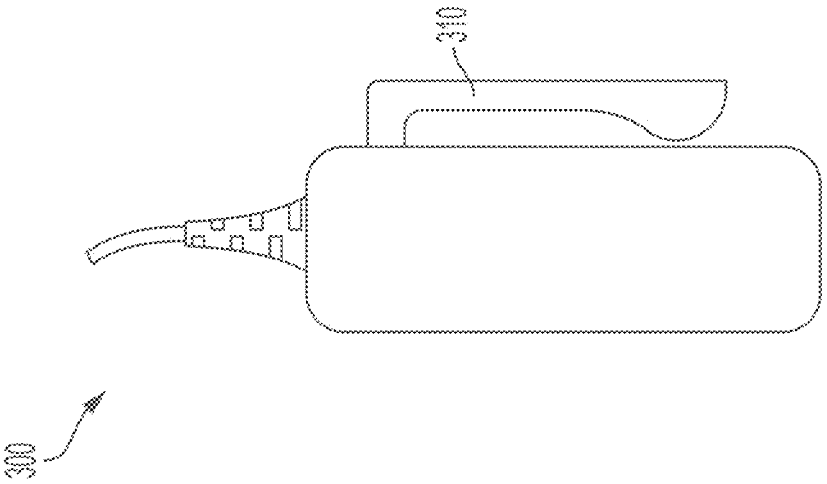
FIG. 3 illustrates an example auxiliary unit that can be used in conjunction with an example wearable system, according to some embodiments.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well-suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
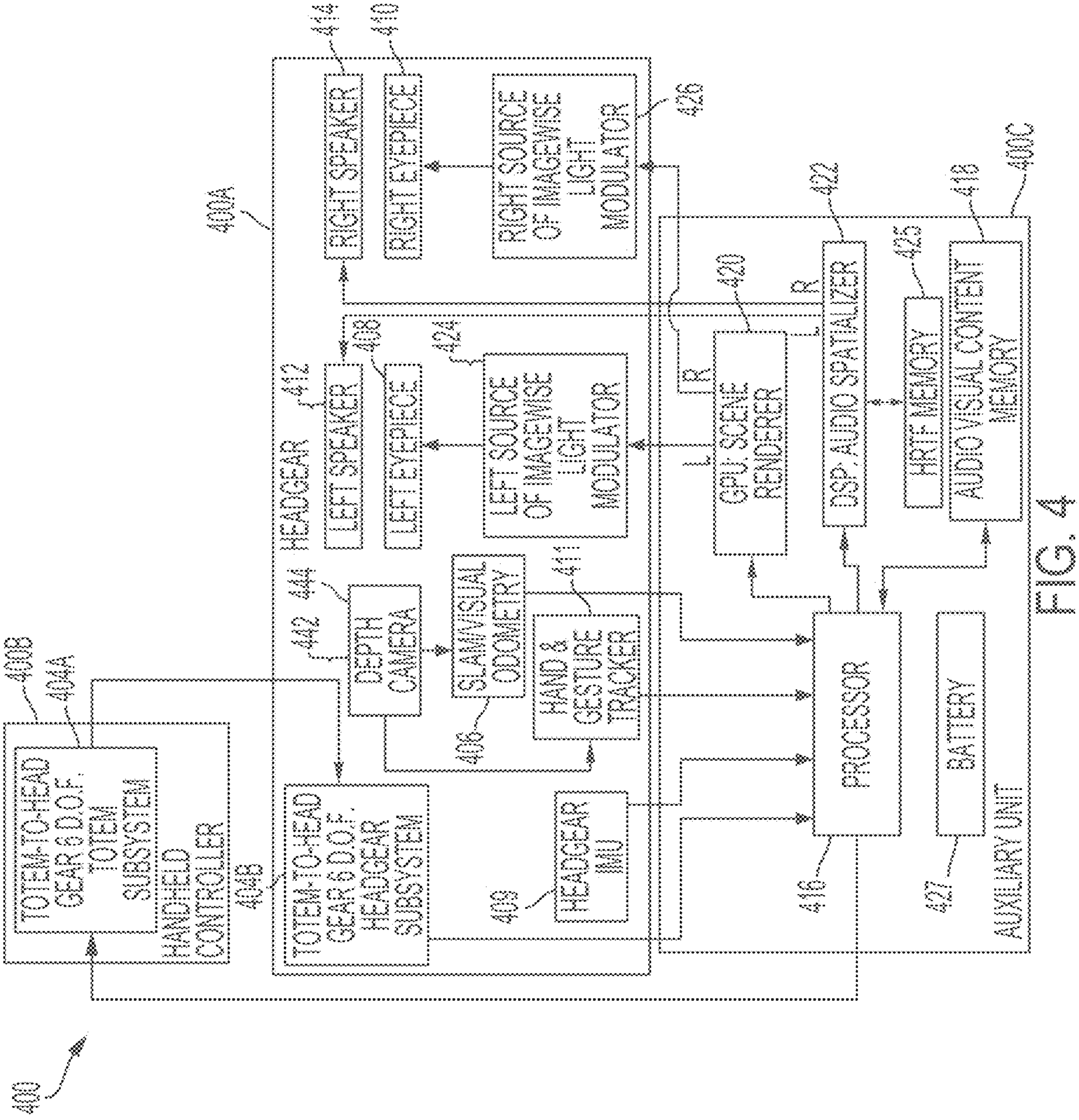
FIG. 4 illustrates an example functional block diagram for an example wearable system, according to some embodiments.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include an example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example wearable head device 400A (which may correspond to wearable headgear device 100 described above); the wearable head device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations; as vectors; as a rotation matrix; as a quaternion; or as some other representation. In some examples, one or more depth cameras 444 (and/or one or more non-depth cameras) included in the wearable head device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the wearable head device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to wearable head device 400A) to an inertial coordinate space, or to an environmental coordinate space. For instance, such transformations may be necessary for a display of wearable head device 400A to present a virtual object at an expected position and orientation relative to the real environment (e.g., a virtual person sitting in a real chair, facing forward, regardless of the position and orientation of wearable head device 400A), rather than at a fixed position and orientation on the display (e.g., at the same position in the display of wearable head device 400A). This can maintain an illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the wearable head device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of wearable head device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head device 400A. The hand gesture tracker 411 can identify a user's hand gestures, for example, by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, a microphone (not shown); and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 416 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to wearable head device 400A and/or handheld controller 400B. Including such components in an auxiliary unit, which can be mounted to a user's waist, can limit the size and weight of wearable head device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with wearable head device 400A or handheld controller 400B. Furthermore, some wearable systems may forgo entirely a handheld controller 400B or auxiliary unit 400C. Such changes and modifications are to be understood as being included within the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example, in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time, based on data associated with the virtual environment and/or input provided by a user, a state of the virtual environment at a second time. For instance, if an object in the virtual environment is located at a first coordinate at time, and has certain programmed physical parameters (e.g., mass, coefficient of friction); and an input received from user indicates that a force should be applied to the object in a direction vector; the processor can apply laws of kinematics to determine a location of the object at time using basic mechanics. The processor can use any suitable information known about the virtual environment, and/or any suitable input, to determine a state of the virtual environment at a time. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

Digital Reverberation and Environmental Audio Processing

A XR system can present audio signals that appear, to a user, to originate at a sound source with an origin coordinate, and travel in a direction of an orientation vector in the system. The user may perceive these audio signals as if they were real audio signals originating from the origin coordinate of the sound source and traveling along the orientation vector.

In some cases, audio signals may be considered virtual in that they correspond to computational signals in a virtual environment, and do not necessarily correspond to real sounds in the real environment. However, virtual audio signals can be presented to a user as real audio signals detectable by the human ear, for example, as generated via speakers 120A and 120B of wearable head device 100 in FIG. 1.

Advantages to the below disclosed embodiments include reduced network bandwidth, reduced power consumption, reduced computational complexity, and reduced computational delays. These advantages may be particularly significant to mobile systems, including wearable systems, where processing resources, networking resources, battery capacity, and physical size and heft are often at a premium.

In an environment as dynamic as AR, the system may be continuously rendering audio signals. Rendering audio signals using all of the virtual speakers may especially lead high computational power, a large amount of processing, high network bandwidth, high power consumption, and the like. Thus, using modified virtual speaker panning to dynamically select and use a subset set of the fixed virtual speakers based one or more factors may be desired.

Example Spatial Audio System

Figure 5A:
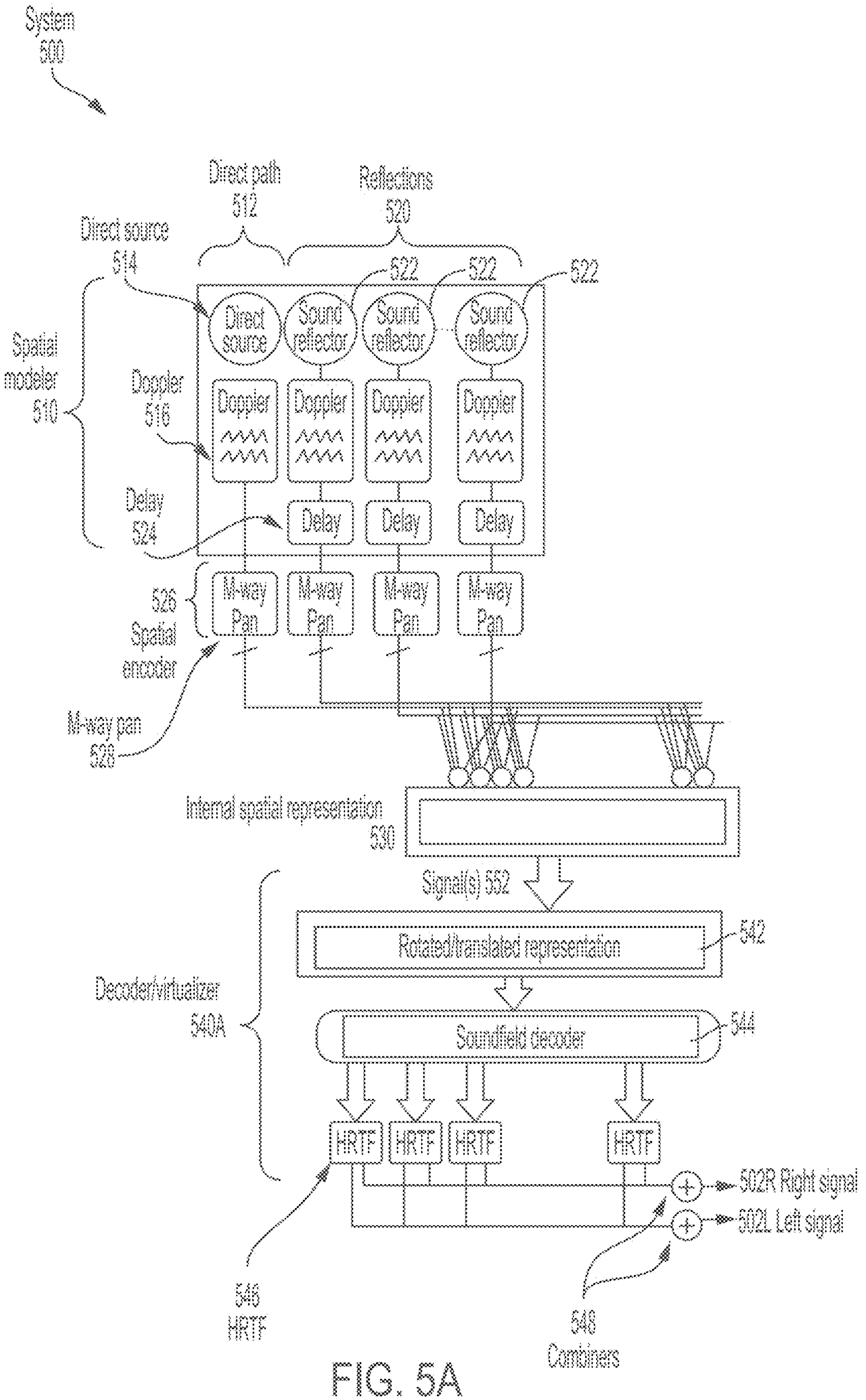
FIG. 5A illustrates a block diagram of an example spatial audio system, according to some embodiments.
Figure 5B:
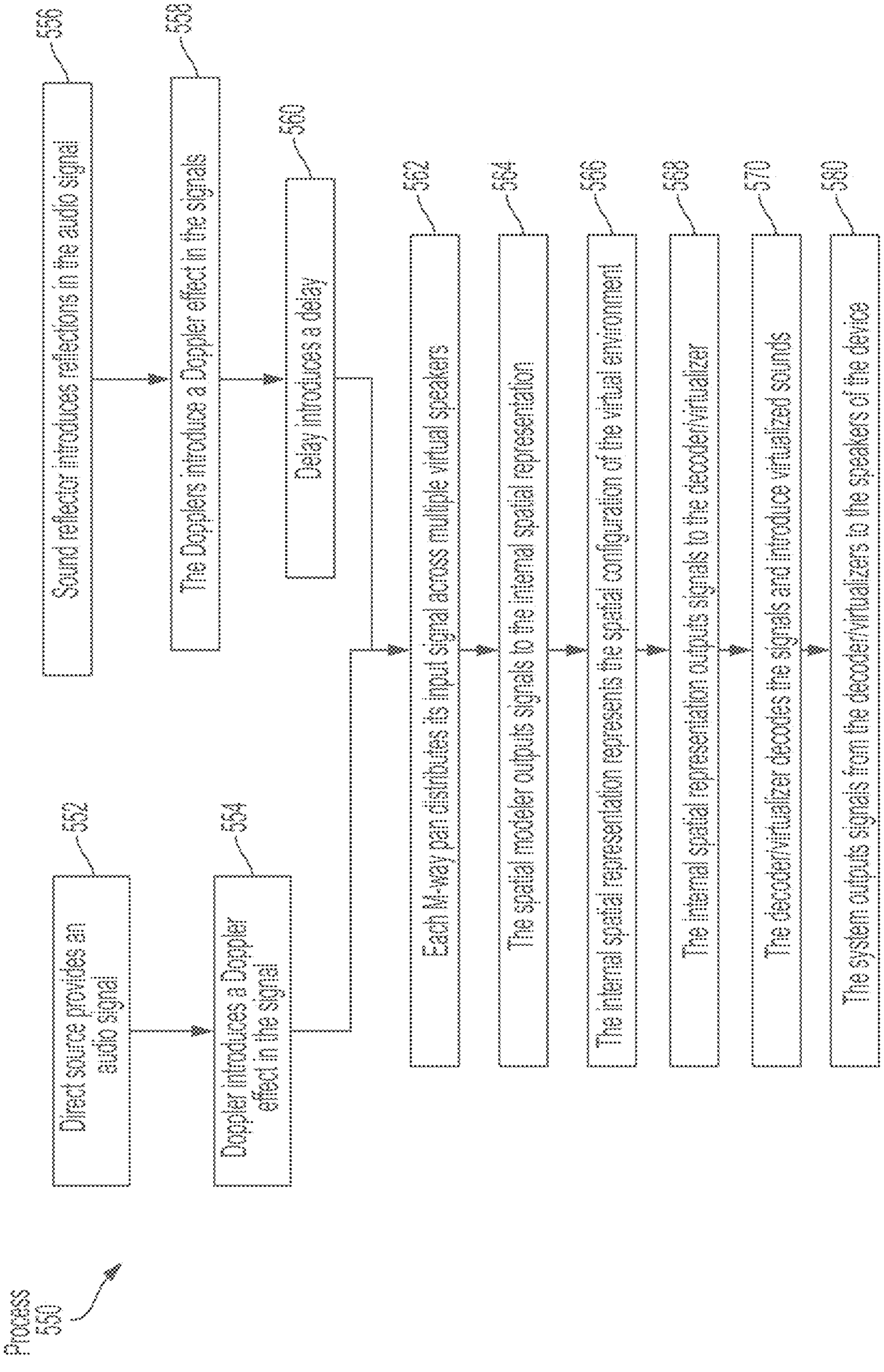
FIG. 5B illustrates a flow of an example method for operating the system of FIG. 5A, according to some embodiments.

FIG. 5A illustrates a block diagram of an example spatial audio system, according to some embodiments. FIG. 5B illustrates a flow of an example method for operating the system of FIG. 5A.

The spatial audio system 500 may include a spatial modeler 510, an internal spatial representation 530, and a decoder/virtualizer 540A. The spatial modeler 510 may include a direct path portion 512, one or more reflections portions 520 (optional), and a spatial encoder 526. The spatial modeler 510 may be configured to model a virtual environment. The direct path portion 512 may include a direct source 514, and optionally, a Doppler 516. The direct source 514 may be configured to provide an audio signal (step 552 of process 550). The Doppler 516 may receive a signal from the direct source 514 and may be configured to introduce a Doppler effect into its input signal (step 554). For example, the Doppler 516 may change the pitch of the sound source (e.g., pitch shifting) to change relative to the motion of the sound source, the user of the system, or both.

The reflections portions 520 may include a sound reflector 522, an optional Doppler 516, and a delay 524. The sound reflector 522 may be configured to introduce reflections in its signal (step 556). The reflections introduced may be representative of one or more properties of the environment. The Doppler 516 in a reflections portion 520 may receive a signal from the sound reflector 522 and may be configured to introduce a Doppler effect into its input signal (step 558). The delay 524 may receive a signal from the Doppler 516 and may be configured to introduce a delay (step 560).

The spatial encoder 526 may receive signals from the direct path portion 512 and the reflections portion(s) 520. In some embodiments, the signal from the direct path portion 512 to the spatial encoder 526 may be the output signal from the Doppler 516 of the direct path portion 512. In some embodiments, the signal(s) from the reflections portion(s) 520 to the spatial encoder 526 may be the output signal(s) from the delay(s) 524 of the reflections portion(s) 520.

The spatial encoder 526 may include one or more M-way Pans 528. In some embodiments, each input received by the spatial encoder 526 may be associated with a unique M-way Pan 528. "Panning" may refer to distributing a signal across multiple speakers, multiple locations, or both. The M-way pan 528 may be configured to distribute its input signal across multiple number of virtual speakers (step 562). For example, an M-way pan 528 can distribute its input signal across all M virtual speakers. For example, as shown in the FIG. 5A, M may be equal to four, and each M-way pan 528 may be configured to distribute its input signal across four virtual speakers. Although the figure illustrates a system having four virtual speakers, examples of the disclosure can include any number of virtual speakers.

As one example, a car system may include left and right speakers. The sound in such system may be panned between left and right speakers in a car by splitting the sound into two, one for each speaker. The scaling volume of each speaker may be set according to the configuration of two speakers, and the result may sent to the left and right speakers.

As another example, a surround sound system may include a plurality of speakers, such as six speakers. The sound in such system may be panned as stereo among the six speakers. The sound may be split into six (instead of two, as in the car system example), the scaling volume of each speaker may be set according to the configuration of six speakers, and the result may be sent to the six speakers.

For example, a first M-way pan 528 may receive the output of the Doppler 516 of the direct path 512, and the other M-way pans 528 may receive the outputs of the reflections portions 520. Each M-way pan 528 can split its input signal so that it may be distributed across multiple outputs. As such, each M-way pan 528 may have a greater number of outputs than inputs.

The spatial modeler 510 may output signals to the internal spatial representation 530 (step 564). In some embodiments, the output(s) from the spatial modeler 510 can include the output of each M-way pan 528. The internal spatial representation 530 may be configured to represent the spatial configuration of the virtual environment (step 566). One example representation can include representing the relative location of the user, the sound source(s), and the virtual speaker(s). In some embodiments, the internal spatial representation 530 may output one or more signals representative of the headpose rotation, the headpose translation, soundfield decode, one or more head-related transfer functions (HRTFs), or a combination thereof, of the user of the system 500. In some embodiments, the internal spatial representation 530 may be a representation of a non-ambisonics multi-channel based system, an ambisonics/wavefield based system, or the like. One example ambisonics/wavefield based system can be a high order ambisonics (HOA).

The internal spatial representation 530 may output its signals 552 to the decoder/virtualizer 540A (step 568). The decoder/virtualizer 540 may decode its input signals and introduce virtualized sounds into the signals (step 570). Step 570 can include a plurality of substeps and is discussed in more detail below. The system then outputs the signals from the decoder/virtualizer 540 (step 580) as the left signal 502L, which may be output to the left speaker, and the right signal 502R, which may be output to the right speaker.

The system 500 may include any number of different types of a decoder/virtualizer 540. One example decoder/virtualizer 540A is shown in FIG. 5A. Other example decoder/virtualizers 540 are discussed below.

Figure 5C:
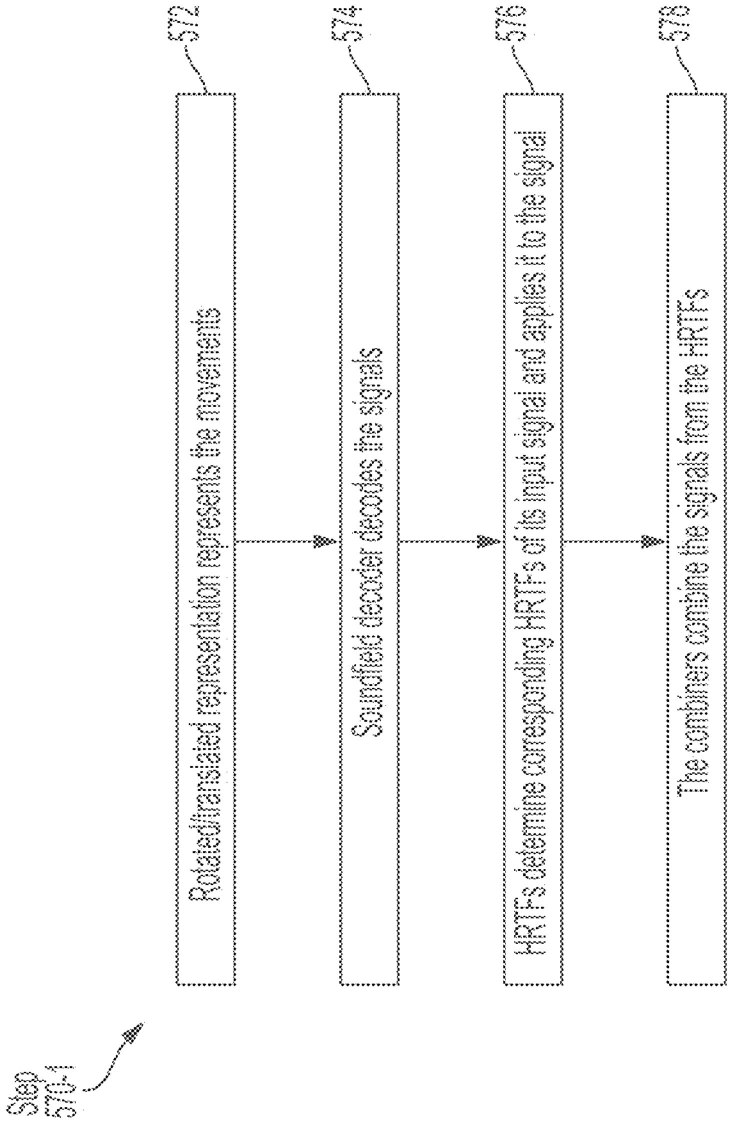
FIG. 5C illustrates a flow of an example method for operating an example decoder/virtualizer, according to some embodiments.

The decoder/virtualizer 540A may include a rotated/translated representation 542, a soundfield decoder 544, one or more HRTFs 546, and one or more combiners 548. FIG. 5C illustrates a flow of an example method for operating an example decoder/virtualizer, which may be referred to as step 570-1. The rotated/translated representation 542 may receive signal(s) from the internal spatial representation 530 and may be configured to introduce representations of the movements associated with the audio signals. For example, the movements can be of the sound source(s), the user, or both (step 572). The rotated/translated representation 542 can output signal(s) to the soundfield decoder 544. The soundfield decoder 544 may receive signal(s) from the rotated/translated representation 542 and may be configured to decode the signals (step 574). Each HRTF 546 may receive signal(s) from the soundfield decoder 544. Each HRTF 546 may be configured to determine a HRTF corresponding to its input signal and apply it to the signal (step 576). The one or more HRTFs 546 may be referred to collectively as a speaker virtualizer. In some embodiments, the HRTF 546 may be configured for finite impulse response (FIR) filtering. Each combiner 548 may receive and combine signal(s) from the HRTF(s) 546 (step 578).

In some embodiments, the decoder/virtualizer 540A may represent a "baseline" processing overhead. The baseline processing overhead may be complex, involving matrix calculations and long FIR filters to apply HRTF processing for each virtual speaker.

The outputs from the combiners 548 may be the output signals form the system 500. In some embodiments, the output signals 502 from the system 500 may be audio signals for the left and right speakers (e.g., speakers 120A and 120B of FIG. 1).

In some instances, when the number of sound sources for play back is large, the spatial audio system of FIG. 5A may be beneficial. However, in some instances, when the number of sound sources for play back is small, the spatial audio system of FIG. 5A may not be beneficial. It may be desirable to utilize efficiencies of non-ambisonics multi-channel based spatial audio systems or ambisonics-based spatial audio systems, such as system 500 of FIG. 5A, in a way that is efficient for situations when the number of sound sources for play back is small.

There may be ways to improve the efficiencies of spatializing using soundfield synthesis and decoding. A first way may be through low energy speaker detection and culling. In low energy speaker detection and culling, if the energy output of a virtual speaker channel of a non-ambisonics multi-channel based spatial audio system or ambisonics/soundfield channel of an ambisonics based spatial audio system is less than a predetermined threshold, processing of the signals from the virtual speaker channel is not performed. In some embodiments, the system may determine whether an output of a given virtual speaker is above a predetermined threshold, for example, before the sound field decoding is performed on the signals from that given virtual speaker. Low energy speaker detection and culling is discussed in more detail below.

A second way for improving the efficiency of spatializing using soundfield synthesis and decoding can be source geometry-based virtual speaker culling. In source geometry-based virtual-speaker culling, the decoder/virtualizer processing can be selectively disabled. The selective disablement (or selective enablement) can be based on the location(s) of the sound source(s) relative to the user/listener. Source geometry-based virtual speaker culling is discussed in more detail below.

A third way may be to combine the low energy speaker detection and culling technique with the source-virtual speaker coupling technique.

A spatial modeler 510 may have a compute complexity that may represent the number of operations needed to process the audio signals. The compute complexity may be proportional to M multiplied by N, where M may be equal to the number of sound sources (including direct sources and optional reflections) and N may be equal to the number of channels needed to represent an ambisonic soundfield. In some embodiments, N may equal to $(O+1)^2$, where O is the order of ambisonics used.

A decoder/virtualizer 540 may have a compute complexity proportional to nVS, where nVS is a number of virtual speakers. The compute power of each speaker may be high and may generally consist of a pair of FIR filters typically implemented with fast Fourier transform (FFT) or inverse FFT (IFFT), both of which may be computationally expensive processes.

Example Low Energy Output Detection and Culling Method

In some embodiments, some virtual speakers may have little or not signal input energy; for example, when the spatial audio system has a small number of sound sources. Speaker virtualization processing may be computationally expensive (e.g., CPU intensive) process. For example, if there is a sound source located at zero degrees azimuth (e.g., directly in front of a user), there may be little or no energy in the signals from the virtual speakers located between 90 degrees and 270 degrees azimuth (e.g., behind the user). The low energy signals may not have a significant effect on the perceived location of a sound source, so it may be computationally inefficient to perform speaker virtualization processing on the low energy signals and/or to determine the characteristics of the corresponding virtual speaker.

To lessen computation resources required, the system employing low energy output detection and culling method can include detectors located between the soundfield decoder and a HRTF. Alternatively, the detectors may be located between the multi-channel output and a HRTF. The detectors may be configured to detect one or more energy levels associated with one or more audio signals from one or more virtual speakers.

If the energy level of a signal coming from a virtual speaker Vn is less than an energy threshold a, the signal may be considered a low energy signal. In accordance with the detected energy level associated with the audio signal being less than the energy threshold a, the HRTF block and its processing of the low energy signal may be bypassed.

The determination of the energy levels of a signal may use any number of techniques. For example, a RMS algorithm may be applied to a signal routed to a virtual speaker to measure its energy. “Attack” and “release” times similar to those used by times similar to those by traditional audio compressors may be used to keep a speaker’s signal from abruptly “popping” in and out.

Figure 6:
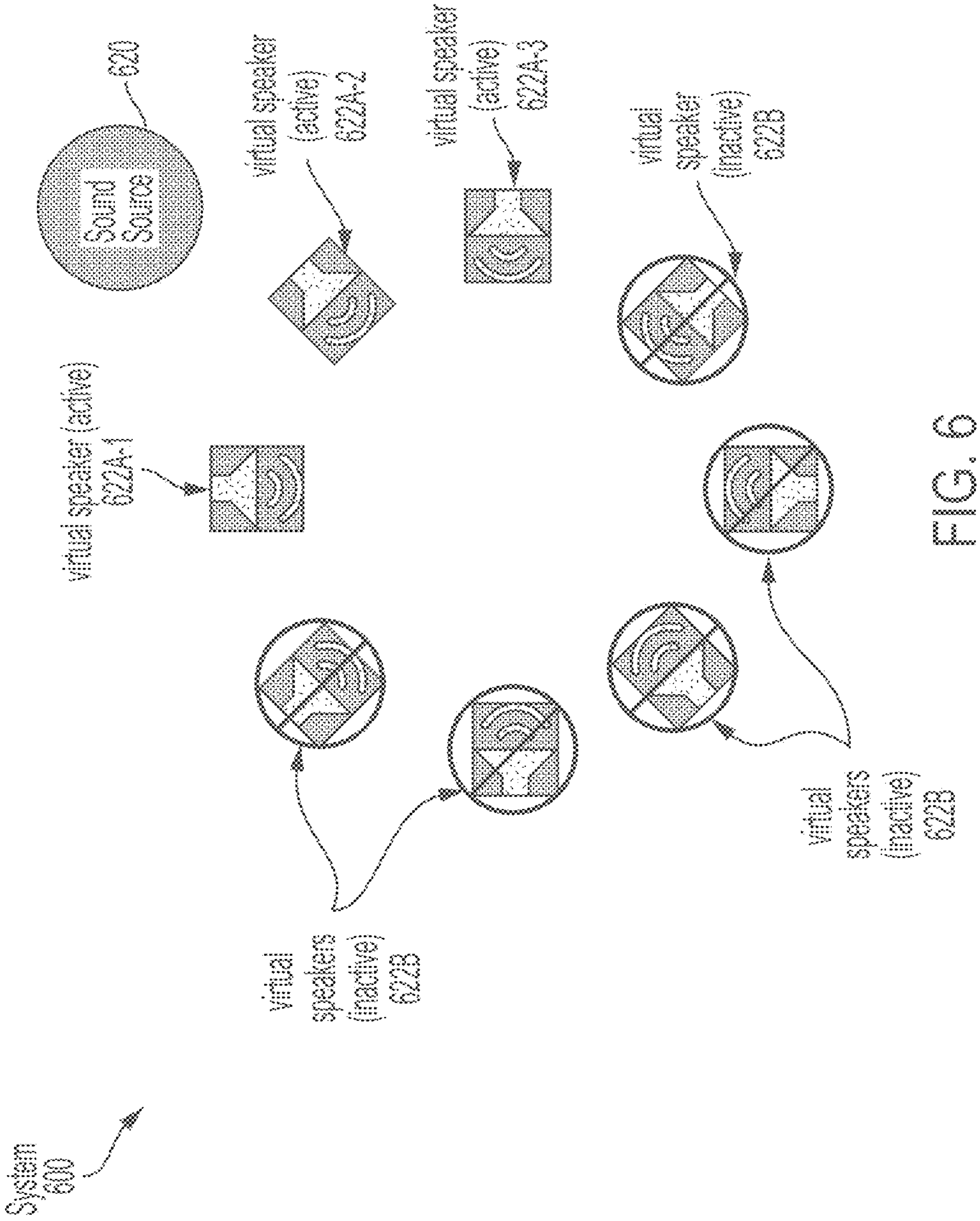
FIG. 6 illustrates an example configuration of a sound source and speakers, according to some embodiments.

FIG. 6 illustrates an example configuration of a sound source and speakers, according to some embodiments. System 600 may include a sound source 620 and a plurality of speakers. The plurality of speakers 622 may include one or more active virtual speakers 622A and one or more inactive virtual speakers 622B. An active virtual speaker 622A may be one whose signal is processed by a HRTF 546 at a given time. An inactive virtual speaker 622B may be one whose signal not need to be processed by a HRTF 546 because, e.g., its signal was already processed at a previous time, or because the system determines that signal from the virtual speaker 622B does not need processing. M can refer to the number of sound sources playing, and N can refer to the number of virtual speakers in the system. Although the figure illustrates a single sound source, examples of the disclosure can include any number of sound sources. Although the figure illustrates eight sound sources, examples of the disclosure can include any number of sources, such as 16 (N=16).

As one example, system 600 can include a single (M=1) sound source 620 and 8 virtual speakers 622, as shown in the figure. At a given instance, most of energy may be output across only three virtual speakers. That is, the system 600 may have three active virtual speakers at a first time. For example, the virtual speakers 622A-1, 622A-2, and 622-3 may be active virtual speakers. In some embodiments, the active virtual speakers 622A may be those closest to the sound source 620. Additionally, the system 600 may include five inactive virtual speakers 622B. The system 600 may be determine that the energy level from each of the five inactive virtual speakers is less than an energy threshold, and in accordance with such determination, may bypass the HRTF processing of the signals from the five inactive virtual speakers 622B.

The system 600 may also determine that the energy level from each of the active virtual speakers is not less than the energy threshold, and in accordance with such determination, may perform HRTF processing of the signals from the three active virtual speakers 622A.

The system 600 may output two signals, one for the right speaker and one for the left speakers, such as right signal 502R and left signal 502L, as shown in FIG. 5A. The reduction in number of HRTF operations due to bypassing the HRTF processing may be equal to the number of inactive virtual speakers multiplied by the number of signals output from the system. In the example of FIG. 6, since the HRTF processing of the five signals are bypassed, 10 (five inactive virtual speakers×two output signals) HRTF operations may be saved.

As another example, if the system includes 16 virtual speakers, where 13 are inactive virtual speakers, the number of HRTF operations saved may be equal to 26 (16 virtual speakers×two output signals).

Figure 7A:
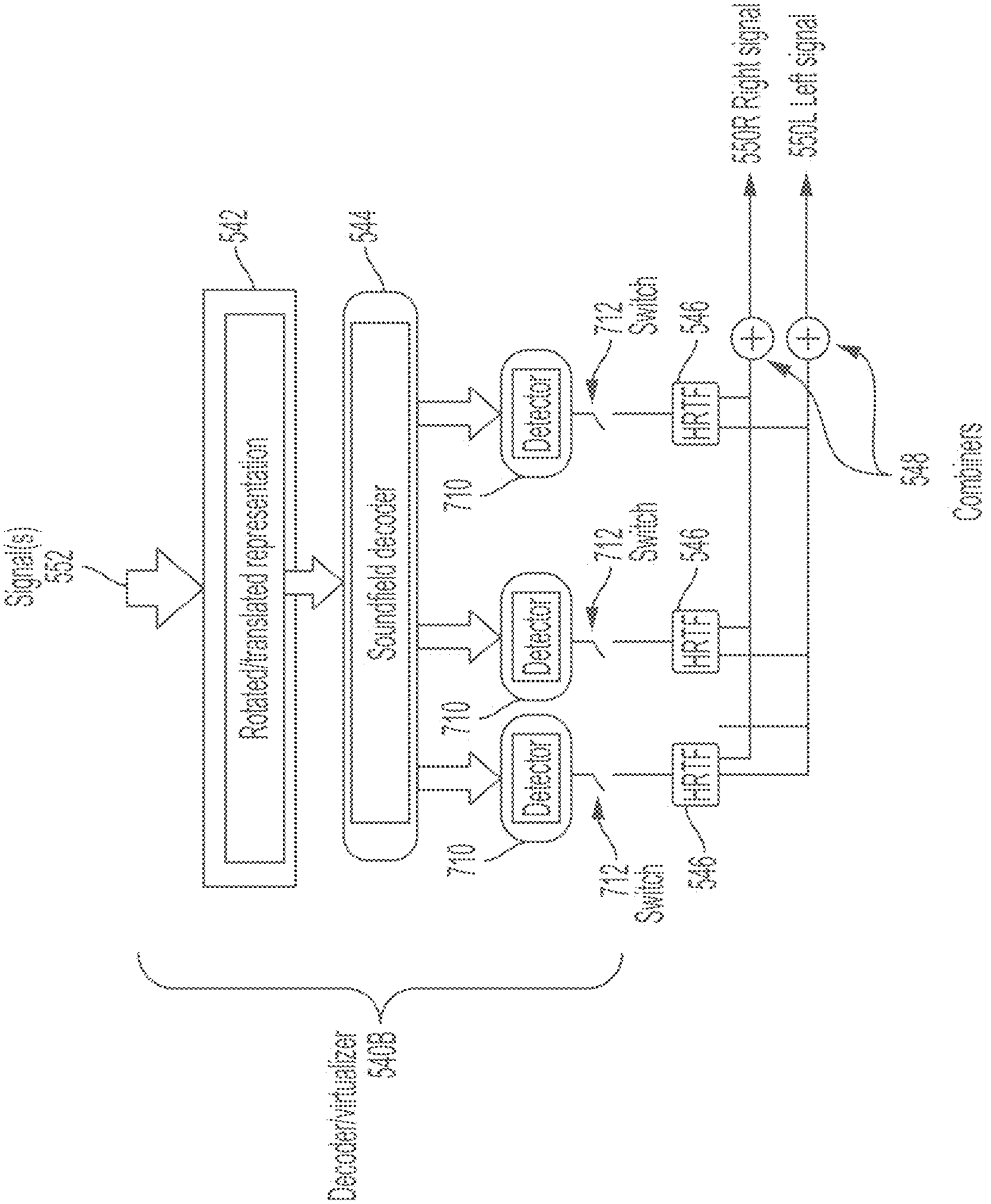
FIG. 7A illustrates a block diagram of an example decoder/virtualizer including a plurality of detectors, according to some embodiments.
Figure 7B:
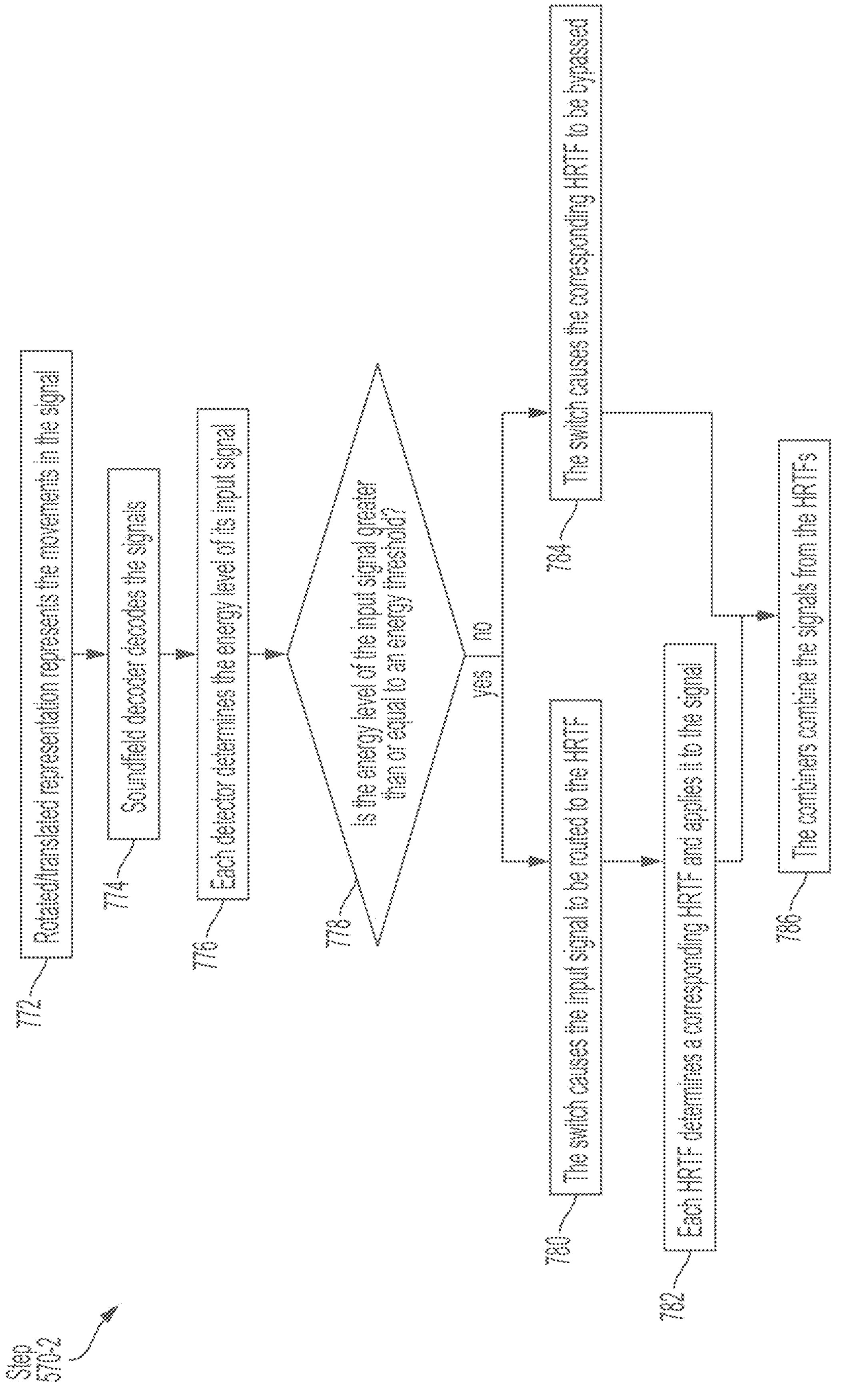
FIG. 7B illustrates a flow of an example method for operating the decoder/virtualizer of FIG. 7A, according to some embodiments.

FIG. 7A illustrates a block diagram of an example decoder/virtualizer including a plurality of detectors, according to some embodiments. FIG. 7B illustrates a flow of an example method for operating the decoder/virtualizer of FIG. 7A, according to some embodiments. In some embodiments, the decoder/virtualizer 540B may be included in system 500, instead of decoder/virtualizer 540A (shown in FIG. 5A), as discussed below. The step 570-2 may be included in the process 550, instead of step 570-1 (shown in FIG. 5C).

The decoder/virtualizer 540B can include a rotated/translated representation 542, soundfield decoder 544, one or more detectors 710, one or more switches 712, one or more HRTFs 546, and one or more combiners 548. The decoder/virtualizer 540B can receive signal(s) 552 from the internal spatial representation 530 (as shown in FIG. 5A). The rotated/translated representation 542 may receive signals from the internal spatial representation 530 and may be configured to introduce representations of the movements of the sound source(s), the user, or both (step 772). The rotated/translated representation 542 can output signal(s) to the soundfield decoder 544. The soundfield decoder 544 can receive signals from the rotated/translated representation 542 and may be configured to decode the signals (step 774). The soundfield decoder 544 can output signals to the detector(s) 710.

The detector(s) 710 may receive a signal from the soundfield decoder 544 and may be configured to determine the energy level of its input signal (step 776). Each detector 710 may be coupled to a unique switch 712. If the energy level of the input signal (from the soundfield decoder 544) is greater than or equal to the energy threshold (step 778), then the switch 712 can close the loop thereby routing its input signal (from the detector 710) to the HRTF 546 that the switch is coupled to (step 780). Each HRTF determines a corresponding HRTF and applies it to the signal (step 782).

If the energy level of the input signal is less than the energy threshold, then the switch 712 can open such that its input signal (from the detector 710) is not coupled to the corresponding HRTF 546. Thus, the corresponding HRTF 546 may be bypassed (step 784).

The signals from the HRTF(s) 546 can be output to the combiners 548 (step 786). The combiners 548 can be configured to combine (e.g., add, aggregate, etc.) the signals from the HRTF(s) 546. Those signals that bypassed a HRTF 546 may not be combined by the combiners 548. The outputs from the combiners 548 may be the output signals form the system 500. In some embodiments, the output signals 502 from the system 500 may be audio signals for the left and right speakers (e.g., speakers 120A and 120B of FIG. 1).

In some embodiments, each detector 710 can be coupled to a unique signal corresponding to a virtual speaker. In this manner, the processing of each virtual speaker 622 can be independently performed (i.e., the processing of one speaker, such as 622A-1, can occur without affecting the processing of another speaker, such as 622B).

In some embodiments, the type of decoder/virtualizer 540 may depend on the number of sound sources. For example, if the number of sound sources is less than or equal to a predetermined sound source threshold, then the decoder/virtualizer 540B of FIG. 7A may be included in the system 500. In such instance, the signals from the soundfield decoder 544 may be input to the detector(s) 710.

If the number of sound sources is greater than the predetermined sound source threshold, then the decoder/virtualizer 540A of FIG. 5A may be included in the system. In such instance, the signals from the soundfield decoder 544 may be input to the HRTFs 546.

Figure 8A:
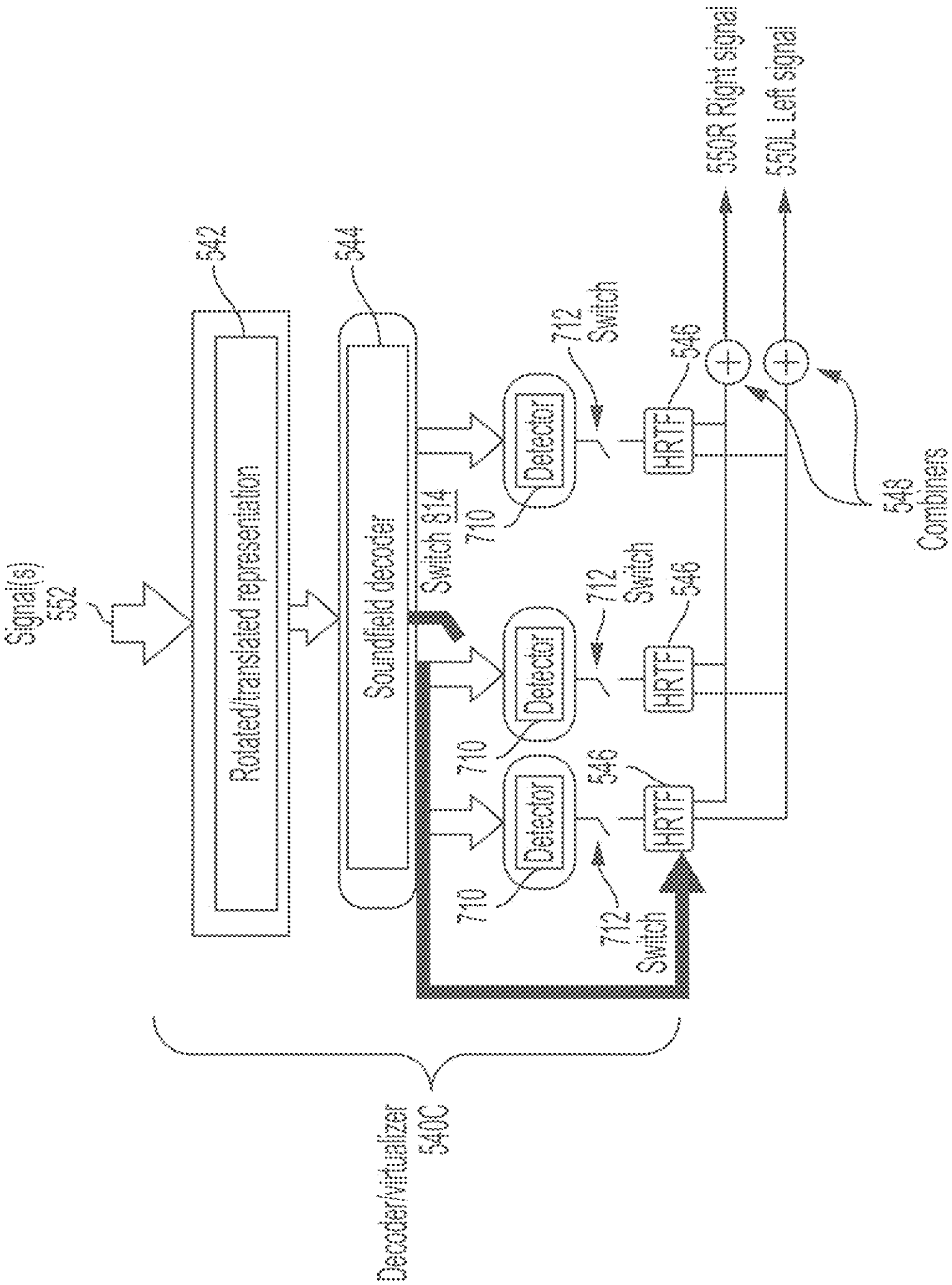
FIG. 8A illustrates a block diagram of an example decoder/virtualizer, according to some embodiments.
Figure 8B:
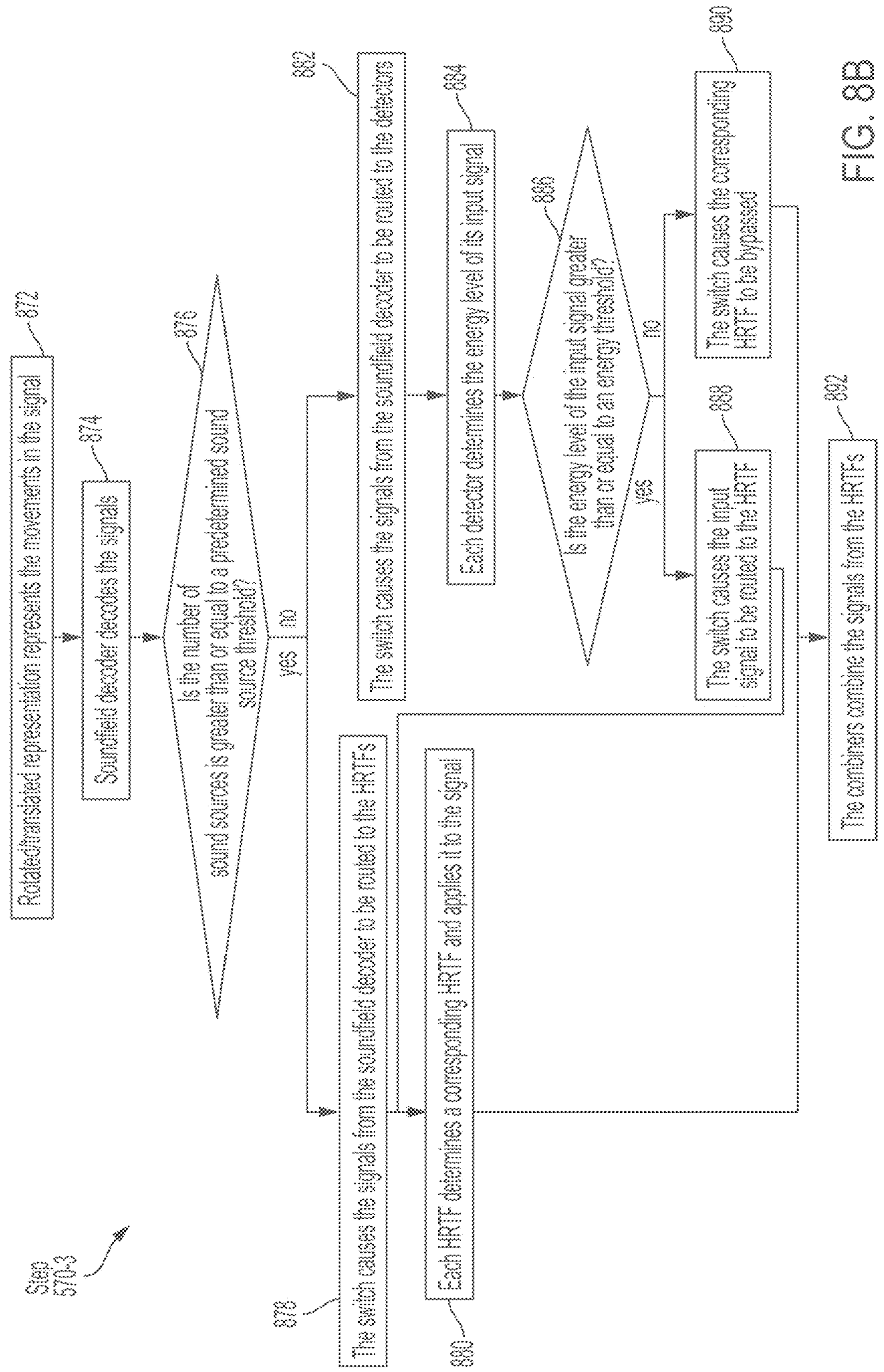
FIG. 8B illustrates a flow of an example method for operating the decoder/virtualizer of FIG. 8A, according to some embodiments.

In some embodiments, the system may include a decoder/virtualizer 540 that may select whether to execute or to bypass the detectors and its energy level detection. FIG. 8A illustrates a block diagram of an example decoder/virtualizer, according to some embodiments. FIG. 8B illustrates a flow of an example method for operating the decoder/virtualizer of FIG. 8A, according to some embodiments. In some embodiments, the decoder/virtualizer 540C may be included in system 500, instead of decoder/virtualizer 540A (shown in FIG. 5A) and decoder/virtualizer 540B (shown in FIG. 7A). The step 570-3 may be included in the process 550, instead of step 570-1 (shown in FIG. 5C).

The decoder/virtualizer 540C can include a rotated/translated representation 542, soundfield decoder 544, one or more detectors 710, one or more first switches 712, one or more HRTFs 546, and one or more combiners 548, similar to the decoder/virtualizer 540B, discussed above. Steps 872, 874, and 882 may be correspondingly similar to steps 772, 774, and 782, discussed above.

The decoder/virtualizer 540C may also include a second switch 814. The second switch 814 can be configured to open or close a first loop from the soundfield decoder 544 to the detector(s) 710 and the first switch(es) 712. Additionally or alternatively, the second switch 814 can be configured to open or close a second loop from the system 500 bypassing the detector(s) 710 and first switch(es) 712. In some embodiments, the second switch 814 may be a two-way switch configured to select between passing the signals directly to the detectors 710 (the first loop) or directly to the HRTFs 546 (the second loop).

For example, the system can determine whether the number of sound sources is greater than or equal to a predetermined sound source threshold (step 876). If the number of sound sources is greater than or equal to a predetermined sound source threshold, then the second switch 814 can close the second loop and cause the signals from the soundfield decoder 544 to be pass directly to the HRTFs 546 (step 878). Each HRTF 546 then determines a corresponding HRTF and applies it to the signal (step 880). When the number of sound sources is greater in number, the likelihood of the signals having low energy levels may be reduced.

If, on the other hand, the number of sound sources is less than a predetermined sound source threshold, then the signals are more likely to have low energy levels, so the second switch 814 can close the first loop and cause the signals from the soundfield decoder 544 to pass directly to the detector(s) 710 (step 882). The detector(s) 710 may receive a signal from the soundfield decoder 544 and may be configured to determine the energy level of its input signal (step 884). If the energy level of the input signal (from the soundfield decoder 544) is greater than or equal to the energy threshold (step 886), then the switch 712 can close the loop thereby routing its input signal (from the detector 710) to the HRTF 546 that the switch is coupled to (step 888). If the energy level of the input signal is less than the energy threshold, then the switch 712 can open such that its input signal (from the detector 710) is not coupled to the corresponding HRTF 546, causing the HRTF 546 to be bypassed (step 890).

The signals from the HRTF(s) 546 can be output to the combiners 548 (step 892).

In some embodiments, the one or more energy threshold detection may be active responsive to energy. In some embodiments, the one or more energy threshold detection may be active responsive to amplitude, may be subject to traditional attack, release times, and the like.

Example Source Geometry-Based Speaker Culling Method

Source geometry-based virtual speaker culling can be another method to reduce CPU consumption. In some embodiments, source geometry-based virtual speaker culling can include selectively disabling the decoder/virtualizer processing (e.g., decoder/virtualizer 540A of FIG. 5A, decoder/virtualizer 540B of FIG. 7A, decoder/virtualizer 540C of FIG. 8A, etc.). In some embodiments, the selective disablement (or selective enablement) can be based on the location(s) of the sound source(s) relative to the user/listener. In some embodiments, the selective disablement of the decoder/virtualizer processing can include bypassing all of the processing blocks of the decoder/virtualizer.

With source geometry-based virtual speaker culling, the ambisonic output can be calculated. If the ambisonic output requires a significant amount of energy to be decoded, then it may be beneficial to use a simpler method (that requires less CPU consumption) such as a real-time energy detection method. Additionally, in some embodiments, the real-time energy detection method can perform a calculation less frequently.

Figure 9:
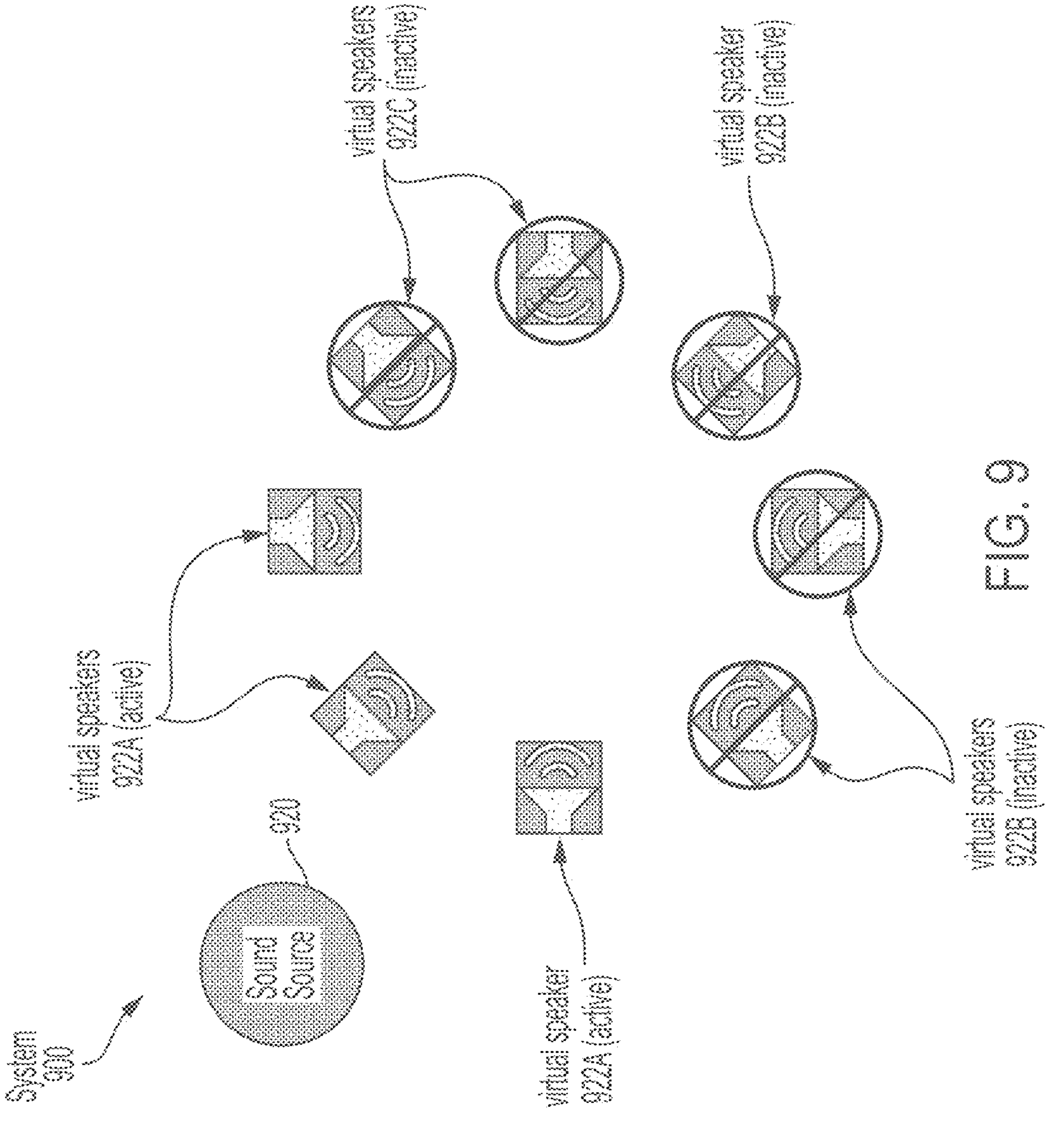
FIG. 9 illustrates an example configuration of a sound source and speakers, according to some embodiments.

FIG. 9 illustrates an example configuration of a sound source and speakers, according to some embodiments. System 900 may include a sound source 920 and a plurality of speakers. Compared to the system 600 of FIG. 6, the sound source 920 may be located at a second position, which may be different from first position of the sound source 620 of FIG. 6. The plurality of speakers 922 may include one or more active virtual speakers 922A, one or more inactive virtual speakers 922B, and one or more inactive virtual speakers 922C. The active virtual speakers 922A and the inactive virtual speakers 922B may be correspondingly similar to the active virtual speakers 622A and the inactive virtual speakers 622B of FIG. 6, respectively.

The inactive virtual speakers 922C may differ from the inactive virtual speakers 922B in that virtual speakers 922C may have been active at a first time, but its signal is being processed at a second time (e.g., the ring out period). In the example of FIG. 9, the sound source 920 may have moved from a first position (e.g., close to virtual speaker 922C) to a second position (e.g., not close to virtual speaker 922). Due to the movement of the sound source, the two virtual speakers may no longer have sound sources mixing into them at the second time. Due to filter processing of the two virtual speakers, the two virtual speakers may need to be active for a following frame (e.g., the second time) to properly complete the filter processing.

Figure 10A:
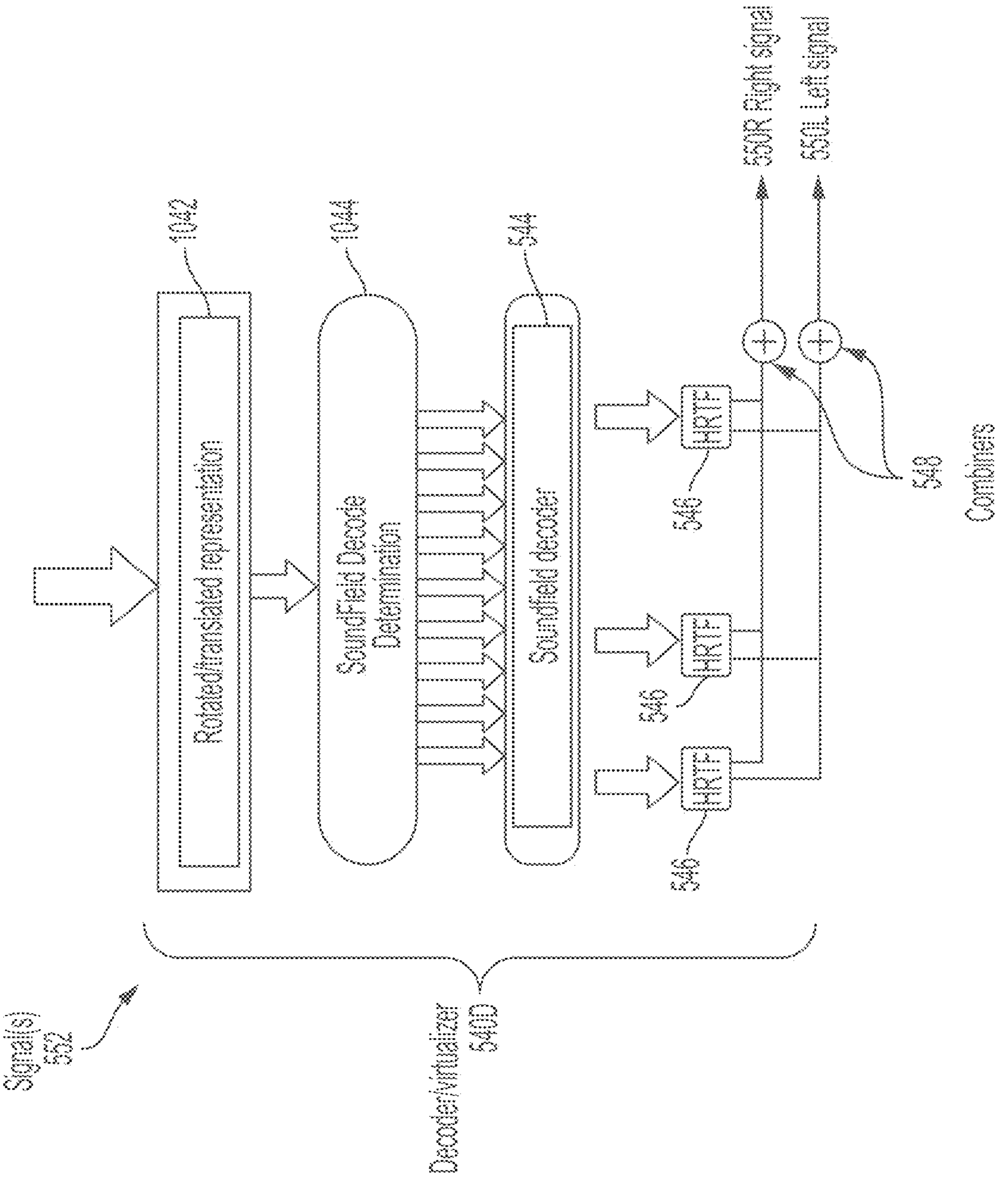
FIG. 10A illustrates a block diagram of an example decoder/virtualizer used in a system including active speakers, according to some embodiments.
Figure 10B:
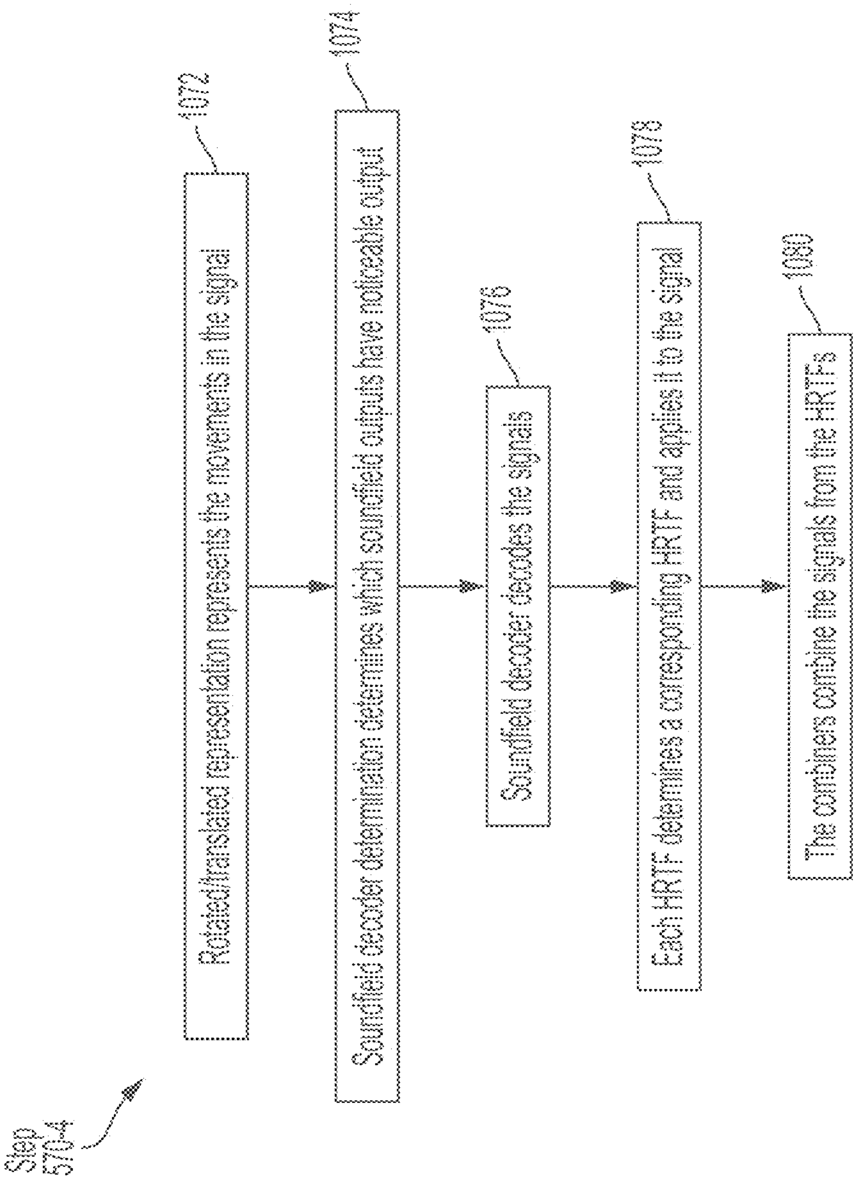
FIG. 10B illustrates a flow of an example method for operating the decoder/virtualizer of FIG. 10A, according to some embodiments.

In some embodiments, the system may include a decoder/virtualizer 540 in a system that uses active virtual speakers. FIG. 10A illustrates a block diagram of an example decoder/virtualizer used in a system including active speakers, according to some embodiments. FIG. 10B illustrates a flow of an example method for operating the decoder/virtualizer of FIG. 10A, according to some embodiments. In some embodiments, the decoder/virtualizer 540D may be included in system 500, instead of decoder/virtualizer 540A (shown in FIG. 5A), decoder/virtualizer 540B (shown in FIG. 7A), and decoder/virtualizer 540C (shown in FIG. 8A). The step 570-4 may be included in the process 550, instead of step 570-1 (shown in FIG. 5C), step 570-2 (shown in FIG. 7B), and step 570-3 (shown in FIG. 8B).

The decoder/virtualizer 540C can include a soundfield decoder 544 one or more HRTFs 546, and one or more combiners 548, similar to the decoder/virtualizer 540B and decoder/virtualizer 540C, discussed above. Steps 1072, 1076, 1078, and 1080 may be correspondingly similar to steps 872, 874, and 782, discussed above.

The decoder/virtualizer 540D may also include a rotated/translated representation 1042 and a soundfield decode determination 1044. The rotated/translated representation 1042 may receive signal(s) from the internal spatial representation 530 and may be configured to introduce representations of the movements of the sound source(s), the user, or both (step 1072). The representations of the movement may also take into consider the azimuth/elevation of the sound source 920. The rotated/translated representation 542 can output signal(s) to the soundfield decoder determination 1044.

The soundfield decoder determination 1044 may receive signal(s) from the rotated/translated representation 1042 and may be configured to determine which signals have "noticeable" output and pass those signals to the soundfield decoder 544 (step 1074). A noticeable output may be an output that would affect a perceived sound. For example, a noticeable output can be an audio signal that has an amplitude greater than or equal to a predetermined amplitude threshold. The soundfield decoder 544 may receive signal(s) from the soundfield decoder determination 1044 having noticeable output and may be configured to decode the signals (step 1076). In some embodiments, the soundfield decoder 1044 may receive signals from the soundfield decoder determination 1044 that have noticeable output. Each HRTF 546 may receive signal(s) from the soundfield decoder 544. Each HRTF 546 may be configured to determine a HRTF corresponding to its input signal and apply it to the signal (step 1078). The one or more HRTFs 546 may be referred to collectively as a speaker virtualizer. Each combiner 548 may receive and combine signal(s) from the HRTF(s) 546 (step 1080).

In some embodiments, those audio signals that do not have a noticeable output (e.g., has an amplitude less than the predetermined amplitude threshold) may not be passed to the soundfield decoder 544. Thus, the soundfield decoder 544 and the HRTFs 546 on the audio signals not having a noticeable output may be bypassed.

The example source geometry-based speaker culling method can designate virtual speakers as being active virtual speakers based on the position (e.g., X, Y, Z location) of the sound source. The location of the sound source may be representative of the location of a source object. The system may determine the location of each sound source and determine which virtual speaker(s) are located close to the respective sound source. In some embodiments, the determination of which virtual speakers are located close to the sound source may be performed at, e.g., the beginning of every video frame (on a video-frame rate based approach). The video-frame rate based approach may require less computation than other approaches such as the sample-rate based approach.

A sound source may contribute significantly to a particular virtual speaker based on, for example, the video-frame rate based approach calculation and an ambisonic decode formula. As discussed above, a virtual speaker that contributes little to no energy if decoded may have the corresponding ambisonic decode and HRTF processing of the decoded ambisonics channel bypassed. In some embodiments, the system may disable any processing block that is bypassed.

Example pseudo-code for executing the designation method can be:

```
For each sound source, S and decode channel n
Enable [n]|=f (sourcePosition Vector3, sourceOrientation
    Vector3, ListenerPosition Vector3, ListenerOrientation
    Vector3, VirtualSpeakerPosition [n] Vector3).
```

Ambisonic/Soundfield Example

```
For each Ambisonic Decode Channel
If (Enable [n]) {
  AmbisonicDecode(n)
  Virtualize(n)
}
```

Multichannel Example

```
For each Channel
If (Enable [n]) {
  Virtualize(n)
}
```

With respect to the above pseudo-code, the variable sourcePosition may refer to a position of a sound source, sourceOrientation may refer to an orientation of the sound source, ListenerPosition may refer to a position of a user/listener, ListenerOrientation may refer to an orientation of the user/listener, VirtualSpeakerPosition may refer to a position of a virtual speaker, AmbisonicDecode may refer to a function that performs ambisonic decoding, and Virtualize may refer to a function that does virtualization.

With respect to the above pseudo-code, for each sound source S and decode channel n, the decode channel n may be enabled based on one or more factors such as the position of the sound source S, the orientation of the sound source S, the position of the user/listener, the orientation of the user/listener, and the position of the virtual speaker. Still referring to the above pseudo-code, for each ambisonic decode channel, if the channel is enabled, then the system may execute the AmbisonicDecode function and the Virtualize function.

The pseudo-code may be enhanced by providing a "ring out" period for each virtual speaker. For example, if a source has moved in position during a video frame, it may be determined that a virtual speaker may no longer have any sound sources mixing into it. However, due to filter processing of the virtual speaker, that virtual speaker may need to be an active speaker for a following frame to properly complete the filter processing.

Examples of the disclosure can include using all active sound sources to determine which decoded soundfield outputs have a "noticeable" output (e.g., an output that would affect a perceived soundfield). Ambisonics or non-ambisonics multi-channel outputs that would affect the perceived soundfield may be decoded. Further, in some embodiments, only HRTFs 546 corresponding to those detected outputs are processed. There may be significant CPU savings for synthetically generated ambisonic soundfield or non-ambisonic multi-channel rendering where a number of the sound sources are small, or are numerous but near each other.

Example Method Combination of the Source Geometry-Based Virtual Speaker Culling Method and the Low Energy Output Detection and Culling Method In some embodiments, source geometry-based virtual speaker culling and low energy output detection and culling may both be used sequentially to further reduce CPU consumption. As described above, source geometry-based virtual speaker culling may include, for example, selectively disabling virtual speaker processing based on, e.g., locations of sound sources relative to a user/listener. Low energy output detection and culling may include, for example, placing a signal energy/level detector between soundfield decoding or multi-channel output and HRTF processing. The output/result of the source geometry-based virtual speaker culling may be input to the low energy output detection and culling.

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to a microphone) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech recognition engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A method of spatially rendering an audio signal, the method comprising:

determining, via one or more sensors of a wearable head device, a spatial configuration of a virtual environment, wherein the spatial configuration comprises at least a user location, a sound source location, and a virtual speaker location;

determining whether a magnitude associated with one or more signals associated with the sound source location exceeds a predetermined threshold; and in accordance with a determination that the magnitude associated with the one or more signals exceeds the predetermined threshold:

decoding the one or more signals, and rendering the audio signal based on the decoded one or more signals.

2. The method of claim 1, further comprising:

further in accordance with the determination that the magnitude associated with the one or more signals exceeds the predetermined threshold, applying the one or more signals to a head-related transfer function (HRTF); and in accordance with a determination that the magnitude associated with the one or more signals does not exceed the predetermined threshold, forgoing applying the one or more signals to the HRTF.

3. The method of claim 1, wherein said decoding the one or more signals comprises applying a first set of processing blocks to the one or more signals, and wherein the method further comprises:

further in accordance with the determination that the magnitude associated with the one or more signals exceeds the predetermined threshold, bypassing a second set of processing blocks, the second set of processing blocks associated with one or more inactive virtual speakers.

4. The method of claim 3, wherein said bypassing the second set of processing blocks comprises forgoing transmitting the one or more signals to a decoder comprising the second set of processing blocks.

5. The method of claim 3, further comprising:

further in accordance with the determination that the magnitude associated with the one or more signals exceeds the predetermined threshold, transmitting the one or more signals to a decoder comprising the first set of processing blocks.

6. The method of claim 5, further comprising:

further in accordance with the determination that the magnitude associated with the one or more signals exceeds the predetermined threshold, applying an output of the decoder to a HRTF.

7. The method of claim 1, wherein said determining the spatial configuration of the virtual environment comprises:

receiving one or more input sound signals, the one or more input sound signals comprising a first input sound signal from a direct sound source and further comprising a second input sound signal from a reflection sound source;

modifying the one or more input sound signals to simulate a doppler effect;

applying a delay to the one or more input sound signals; and panning the one or more input sound signals across a plurality of virtual speakers, wherein said decoding the one or more signals comprises:

determining one or more virtualized sounds, wherein the one or more virtualized sounds are associated with a movement of one or more of the direct sound source, the reflection sound source, and a user.

8. The method of claim 1, wherein the magnitude associated with one or more signals comprises an energy level.

9. The method of claim 8, wherein the energy level is associated with a distance.

10. The method of claim 1, wherein the virtual environment comprises a plurality of sound source locations, and wherein the method further comprises:

determining whether a number of sound source locations in the virtual environment exceeds a predetermined sound source threshold; and in accordance with a determination that the number of sound source locations does not exceed the predetermined sound source threshold, decoding the one or more signals.

11. The method of claim 1, wherein the one or more sensors comprises one or more of infrared sensor, accelerometer, GPS unit, inertial measurement unit, acoustic sensor, electromagnetic receiver, and camera.

12. A system comprising:

a wearable head device comprising one or more sensors; and one or more processors configured to perform a method comprising:

determining, via the one or more sensors, a spatial configuration of a virtual environment, wherein the spatial configuration comprises at least a user location, a sound source location, and a virtual speaker location;

determining whether a magnitude associated with one or more signals associated with the sound source location exceeds a predetermined threshold; and in accordance with a determination that the magnitude associated with the one or more signals exceeds the predetermined threshold:

decoding the one or more signals, and rendering the audio signal based on the decoded one or more signals.

13. The system of claim 12, wherein the method further comprises:

further in accordance with the determination that the magnitude associated with the one or more signals exceeds the predetermined threshold, applying the one or more signals to a head-related transfer function (HRTF); and in accordance with a determination that the magnitude associated with the one or more signals does not exceed the predetermined threshold, forgoing applying the one or more signals to the HRTF.

14. The system of claim 12, wherein said decoding the one or more signals comprises applying a first set of processing blocks to the one or more signals, and wherein the method further comprises:

further in accordance with the determination that the magnitude associated with the one or more signals exceeds the predetermined threshold, bypassing a second set of processing blocks, the second set of processing blocks associated with one or more inactive virtual speakers.

15. The system of claim 12, wherein said determining the spatial configuration of the virtual environment comprises:

receiving one or more input sound signals, the one or more input sound signals comprising a first input sound signal from a direct sound source and further comprising a second input sound signal from a reflection sound source;

modifying the one or more input sound signals to simulate a doppler effect;

applying a delay to the one or more input sound signals; and panning the one or more input sound signals across a plurality of virtual speakers, wherein said decoding the one or more signals comprises:

determining one or more virtualized sounds, wherein the one or more virtualized sounds are associated with a movement of one or more of the direct sound source, the reflection sound source, and a user.

16. The system of claim 15, wherein said bypassing the second set of processing blocks comprises forgoing transmitting the one or more signals to a decoder comprising the second set of processing blocks.

17. The system of claim 15, wherein the method further comprises:

further in accordance with the determination that the magnitude associated with the one or more signals exceeds the predetermined threshold, transmitting the one or more signals to a decoder comprising the first set of processing blocks.

18. The system of claim 12, wherein the magnitude associated with one or more signals comprises an energy level.

19. The system of claim 18, wherein the energy level is associated with a distance.

20. The system of claim 12, wherein the one or more sensors comprises one or more of infrared sensor, accelerometer, GPS unit, inertial measurement unit, acoustic sensor, electromagnetic receiver, and camera.

* * * * *